Patented July 14, 1942

2,289,537

UNITED STATES PATENT OFFICE 2,289,537

PROCESS OF COATING

Elvin M. Bright, Dayton, Ohio, assignor to Plastics Patents Trust, Dayton, Ohio, a trust No Drawing. Application September 19, 1939, Serial No. 295,645

6 Claims. (Cl. 117—102)

This invention relates to a plastic molding material and a nitrocellulose coating applied thereto. This is a continuation in part of my copending application Serial No. 147,355 filed June 9, 1937, for Plastic molding material.

An object of this invention is to produce an article from plastic molding material suitably coated, that has great tensile strength, is cheap; but at the same time beautiful in appearance.

Another object of this invention is to subject the article freshly coated with nitrocellulose material to a solution having attraction for the solvent used in dissolving the nitrocellulose material.

Another object of this invention is to subject the coating to the influence of hygroscopic material, that is, a material that has attraction for moisture or water; but which does not penetrate the nitrocellulose material.

Another object of this invention is to subject the coating to a solution having solvents therein common to the solvent of the nitrocellulose material and to water or moisture without being a solvent for the nitrocellulose material.

Another object of this invention is to maintain the optimum osmotic pressure in the freshly applied coating material.

Another object of this invention is to drain the solvent used in dissolving the nitrocellulose material in the fluid state from the freshly applied coating.

Another object of this invention is to use a solution having an attraction for the solvent used in dissolving the coating material, which solution has its attraction controlled so as to produce the optimum osmotic pressure in the freshly applied coating.

Other objects and advantages reside in the proportion of the ingredients, the combination thereof and the mode of combining, as will become more apparent from the following description.

The nature of this invention is such that no drawings are deemed necessary.

The process of coating an article disclosed herein was developed by coating an article molded from a plastic molding material disclosed in my United States Letters Patent No. 2,152,867 for Game. That being the case, the process will be described in connection with an article molded from the plastic molding material, which article is claimed in the aforementioned patent. It is expressly understood that this process is applicable to coating numerous other articles, whether or not a unitary bond is produced between the article and the coating. This process has been used in coating articles made from wood, from various compositions and from various types of metals. In addition thereto, the process may be utilized in curing articles wherein the nitrocellulose material constitutes the body of the article.

A solvent for the nitrocellulose material is selected that is also a solvent for the surface of the article to be coated. When the solvent for the nitrocellulose material that is common to the material from which the article is coated is used, it usually results in a strong bond between the coating and the article. This is very desirable, so that in the event the coating is cracked, worn through, marred or mutilated, the coating will not drop off as a shell from the article. When the coating is bonded to the article, in the event it is injured the bond will prevent the coating from peeling or dropping off of the article.

The available solvents that are satisfactory may all be classed as highly volatile solvents, in that the solvents have a very low boiling point, especially if the pressure is reduced. The solvents evaporate very rapidly under normal atmospheric conditions. As is well known to those skilled in the art, rapid evaporation results in the reduction of temperature. Furthermore, as the solvents pass out of the surface of the freshly coated article, the osmotic pressure within the article is reduced beyond the optimum osmotic pressure, causing the solvent to boil or gasify within the coating, thereby forming pin holes and blisters in the surface, which are very objectionable.

The solvent used in dissolving the nitrocellulose material need not necessarily be removed by evaporation. Instead, it may be drained from the coating into an extraction solution having an attraction for the solvent, so that the solvent flows as a liquid from the coating into the solution without evaporation. However, in the event the difference in osmotic pressure at the surface is such that the solution withdraws the solvent at such a rapid rate as to reduce the osmotic pressure within the coating, the solvent within the coating will begin to boil or gasify. In my Patent No. 2,152,867 the osmotic pressure within the coating was controlled by cyclically dipping the article into a solution having an attraction for the solvent and then removing the article into a fume zone, arresting further evaporation of the solvent, so as to permit a redistribution of the solvent within the coating. Instead of cyclically dipping the article into a solution having an attraction for the solvent and then arresting the escape of the solvent during the redistribution of the solvent within the coating, an optimum osmotic pressure may be maintained within the coating. "Optimum osmotic pressure," as used herein and in the appended claims, is used to designate the condition at which the solvent is drained most rapidly as a liquid from the coating without evaporation. In other words, it is used to designate the greatest osmotic pressure difference possible without evaporation of the solvent within the coating. The optimum osmotic pressure may be obtained by adding to the solution used in attracting the solvent, sufficient solvent so that the rate at which the solvent is withdrawn from the coating does not result in evaporation of the solvent within the coating. The conditions producing optimum osmotic pressure vary with changes in temperature, changes in ratio of solvent to coating material, changes in thickness of coating applied, changes in the material of the coated article, changes in the solvent used, et cetera.

A desirable solvent and solution having an attraction for the solvent will now be described for the purposes of illustration, rather than a limitation. The solvent may consist of—

Sixty percent (60%) acetone,
Twenty-five percent (25%) isopropyl acetate and
Fifteen percent (15%) anhydrous isopropanol, similar to a compound sold under the trade name Isotone and which will hereinafter be referred to as Isotone. The Isotone solvent found in nitrocellulose coating has an effect upon the outer surface of the molding material used in molding the article, which results in a better outer surface being formed immediately inside the nitrocellulose coating. Articles coated with nitrocellulose material for some reason are more resilient and seem more lively than articles that have not been coated. It has been found upon the removal of the nitrocellulose coating from an article made from the plastic molding material described in United States Letters Patent No. 2,152,867 that the outer surface of the molding material has evidently been changed by the solvent used in dissolving the nitrocellulose material. It seems that when the article is dipped in the nitrocellulose material dissolved in Isotone, some of the Isotone enters the outer surface of the molding material, which causes this outer surface of the molding material to undergo a change. This change in the outer surface of the molding material improves some of the characteristics of the article.

The freshly coated article is now ready to be dipped into a solution having an attraction for the solvent used in dissolving the nitrocellulose material. The nitrocellulose material should be insoluble in the solution which should have no physical and no chemical effect upon the nitrocellulose material.

Gasoline has been used to withdraw a part of the solvent used in dissolving nitrocellulose material, as shown by the prior art. In the patent to Hampton No. 1,946,208 granted February 6, 1934, gasoline was suggested for withdrawing some of the solvent; but Hampton found it necessary to subject the article to an extremely low temperature over a long period of time in order to avoid excessive evaporation, causing pin holes, blisters and the like. In the patent to Bright No. 2,152,867 supra, gasoline was used for withdrawing some of the solvent cyclically. Both Hampton and Bright, as disclosed in their patents, could not use gasoline without afterwards retarding evaporation.

In the process as illustrated, a freshly coated article is dipped into gasoline, which gasoline has been diluted sufficiently with the solvent of the coating material to obtain the optimum osmotic pressure, which permits withdrawal of the solvent as rapidly as possible without causing evaporation or boiling of the solvent remaining in the coating. This process permits the dipping of the freshly coated article into a diluted solution of gasoline, where the article may remain until the solvent has been removed sufficiently to permit the removal of the freshly coated article into normal atmospheric conditions.

By this process the solvent used in dissolving the nitrocellulose material is drained from the article as a liquid, instead of evaporation, as used in part of the treatment disclosed in the patent to Hampton and the above identified patent to Bright.

In the event condensation should form upon the surface of the freshly coated article before it is submerged in the diluted gasoline, the condensation if not removed will blemish the surface of the article. This difficulty caused by condensation may be overcome by subjecting the fresh coating to the influence of a suitable hygroscopic material. This may be accomplished by dipping the freshly coated article into the gasoline solution having added thereto a suitable hygroscopic material, such as alcohol. The gasoline attracts or withdraws some of the solvent used in dissolving the nitrocellulose material and the alcohol absorbs any condensation that may have accumulated upon the surface of the freshly coated article. It has been found that one gallon of alcohol added to forty gallons of gasoline, or whatever other solution is used for withdrawing the solvent of the nitrocellulose material, gives excellent results.

Although the preferred embodiment has been described, it will be understood that within the purview of this invention various changes may be made in the form, details, proportion and ingredients, which generally stated consist in a material capable of carrying out the objects set forth, in the combination of ingredients and method of combination as disclosed and defined in the appended claims.

Having thus described my invention, I claim:

1. The method of coating an article with a coating material, said method including the steps of dipping the article into the coating material dissolved by a solvent that is highly volatile at ordinary atmospheric temperatures, and subsequently dipping the freshly coated article into an extraction solution having an attraction for the solvent used in dissolving the coating material, in which solution said coating material is practically insoluble, said solution having added thereto a sufficient quantity of the aforementioned solvent for the coating material to reduce the attraction of the solution for the solvent to produce optimum osmotic pressure conditions within the coating during the curing of the coating.

2. The method of coating an article with a coating material, said method including the steps of dipping the article into the coating material dissolved by a solvent that is highly volatile at ordinary atmospheric temperatures and dipping the freshly coated article into an extraction solution having an attraction for the solvent used in dissolving the coating material, in which solution said coating material is practically insoluble, said solution having added thereto a small quantity of the aforementioned solvent so as to reduce the attraction of the solution for the solvent, so as to maintain the osmotic pressure sufficiently uniform to cause the solvent to flow in a liquid state at ordinary atmospheric temperatures from the coating material into the solution.

3. The method of coating an article with a coating material, said method including the steps of dipping the article into the coating material dissolved by a solvent that is highly volatile at ordinary atmospheric temperatures and subjecting the freshly coated article to the influence of an extraction fluid medium having an attraction for the solvent used in dissolving the coating material, said fluid medium having added thereto a quantity of the solvent for the coating material to dilute the fluid medium so as to maintain the osmotic pressure sufficiently uniform to maintain the solvent in the fluid state at ordinary atmospheric temperatures while escaping from the coating material into the fluid medium.

4. The method of coating an article with nitrocellulose material, the method including the steps of dipping the article into nitrocellulose material dissolved in a solvent that is highly volatile at ordinary atmospheric temperatures especially when the pressure is reduced by withdrawal of the solvent from the coating, and dipping the freshly coated article into an extraction fluid medium having an attraction for the solvent used in dissolving the nitrocellulose material, said fluid medium failing to materially penetrate the nitrocellulose coating, said medium being diluted by the addition of the solvent used in dissolving the nitrocellulose material so as to control the attraction of said solution for the solvent so as to cause the solvent to escape at ordinary atmospheric temperatures from the nitrocellulose coating into the solution.

5. The method of coating an article with nitrocellulose material, including the steps of dipping the article into nitrocellulose material dissolved by a suitable solvent including acetone, isopropyl acetate and anhydrous isopropanol, which solvent is highly volatile at ordinary atmospheric temperatures especially when the pressure is reduced by withdrawal of the solvent from the coating, and subsequently dipping the freshly coated article into gasoline having added thereto, acetone, isopropyl acetate, anhydrous isopropanol and alcohol, so as to reduce the attraction of the gasoline for the solvent, so as to cause the solvent to flow in a liquid state at ordinary atmospheric temperatures from the coating material into the gasoline.

6. The method of coating an article with nitrocellulose material, said method including the steps of dipping the article into nitrocellulose material dissolved in a suitable solvent that is highly volatile at ordinary atmospheric temperatures and subjecting the freshly coated article to the influence of an extraction fluid solution having an attraction for the solvent used in dissolving the nitrocellulose material, said fluid solution failing to materially penetrate the nitrocellulose coating and having added thereto a quantity of the aforementioned solvent for the nitrocellulose material also failing to materially penetrate the nitrocellulose coating, said solvent reducing the attraction of said extraction fluid solution for the solvent used in dissolving the nitrocellulose material, so as to cause the solvent to escape at ordinary atmospheric temperatures from the coating material into the solution without deleterious gasification.

ELVIN M. BRIGHT.